April 1, 1958 C. J. BATH 2,828,531
METHOD OF MAKING A HELICOPTER BLADE
Filed June 21, 1955 3 Sheets-Sheet 1
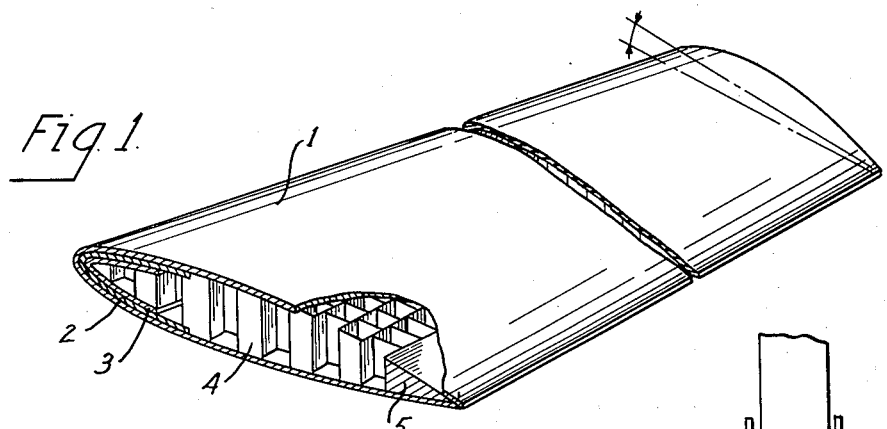
Fig. 1.
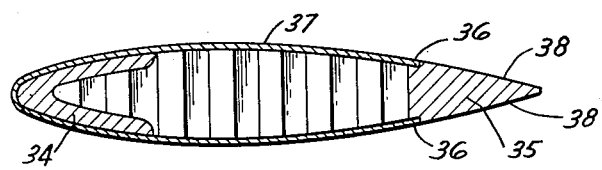
Fig. 9.
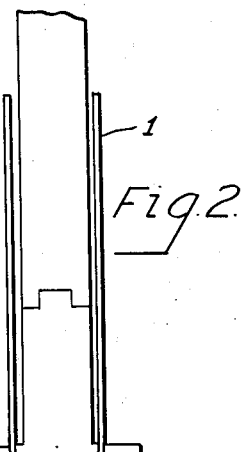
Fig. 2.
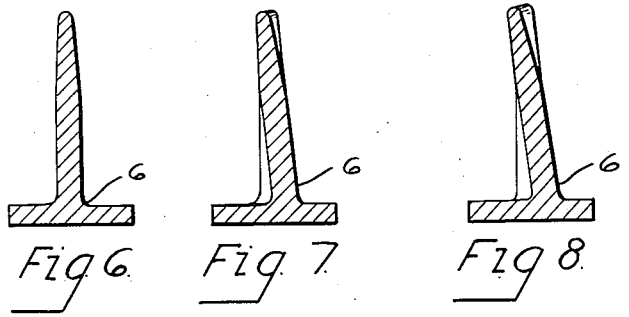
Fig. 6. Fig. 7. Fig. 8.
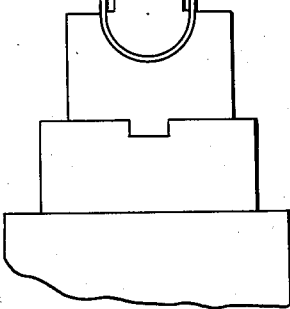
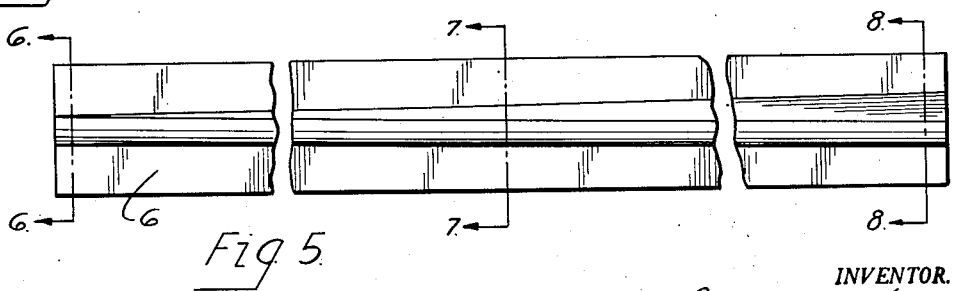
Fig. 5.
INVENTOR.
Cyril J. Bath,
BY Dehr & Leonard,
his ATTORNEYS.

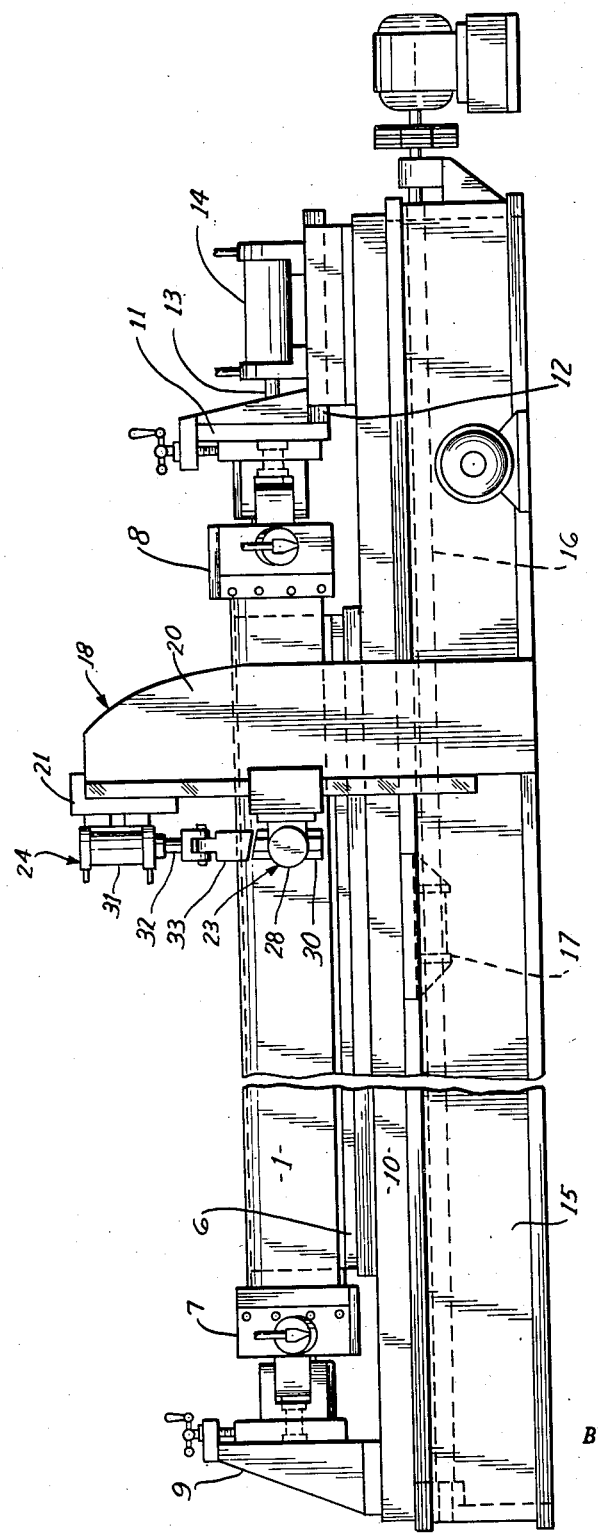

United States Patent Office 2,828,531
Patented Apr. 1, 1958

2,828,531

METHOD OF MAKING A HELICOPTER BLADE

Cyril J. Bath, Lake Lucerne, Ohio, assignor to The Cyril Bath Company, Solon, Ohio, a corporation of Ohio Application June 21, 1955, Serial No. 516,863

4 Claims. (Cl. 29—156.8)

This invention relates to helicopter blades and the like and particularly to the method of making the same.

Heretofore in the formation of helicopter blades, the practice has been to form the skin of a blade in upper and lower halves each of which is made by machining and grinding a roughly preformed billet to the required shape and finish. The halves are then fastened together with suitable reinforcing beams of cellular filler and the like therebetween.

Also, blades have been made simply by bending sheets transversely of their length and nesting a number together and bonding them with metal-bonding cement to form a laminated skin which is reinforced internally with fabricated girders and struts.

In the formation of blades by either of these methods, considerable difficulty is encountered in making blades which are sufficiently light yet which will retain their original shapes under the stresses occasioned by their use. Such blades appear to have poor metallurgical properties.

An object of the present invention is to provide a lighter weight and stronger helicopter blade which has improved metallurgical qualities and grain structure, and which will withstand better the various stresses to which it is subjected in use.

Another object is to provide an improved method of making such blades.

In accordance with the present method, the skin of the blade is formed of a single elongated sheet of the desired metal of which the blade is to be composed. This sheet is rough formed into a deep U-shaped cross section by bending it transversely of its length and then laying it loosely over a mandrel which is shaped to impart the final form which the skin is to have prior to its connection to its auxiliary parts.

The mandrel has the required twist longitudinally to impart the desired twist to the sheet when the sheet is formed thereon, this twist usually being about 7°.

After the skin or sheet is laid over the mandrel it is gripped at the ends in suitable jaws and stretched longitudinally under a force sufficient to tension the metal substantially to, or slightly beyond, its elastic limit. While held in this stretched condition on the mandrel the skin is concurrently wipe formed thereon, preferably by wiping shoes which pass along the stock endwise of the mandrel or blade.

The skin is then removed from the mandrel, suitable reinforces are inserted in the blade at the leading edge, cellular reinforcing material is inserted in the blade, and a closure member is inserted in the blade at the trailing edge. The skin and reinforces for the leading and trailing edges and the cellular reinforcing are bonded together with suitable metal-bonding cement.

Various objects and advantages of the present blade and method of making the same will become apparent from the following description wherein reference is made to the drawings, in which:

Fig. 1 is a fragmentary perspective view of a blade embodying the principles of the present invention;

Fig. 2 is an enlarged diagrammatic end elevation showing the initial bending of the sheet preparatory to the step of wipe and stretch forming it in accordance with the present invention;

Fig. 3 is an enlarged side elevation of an apparatus for forming the skin in accordance with the present method, and showing a sheet of metal being formed into a skin therein;

Fig. 5 is a top plan view of the die or mandrel;

Figure 4:
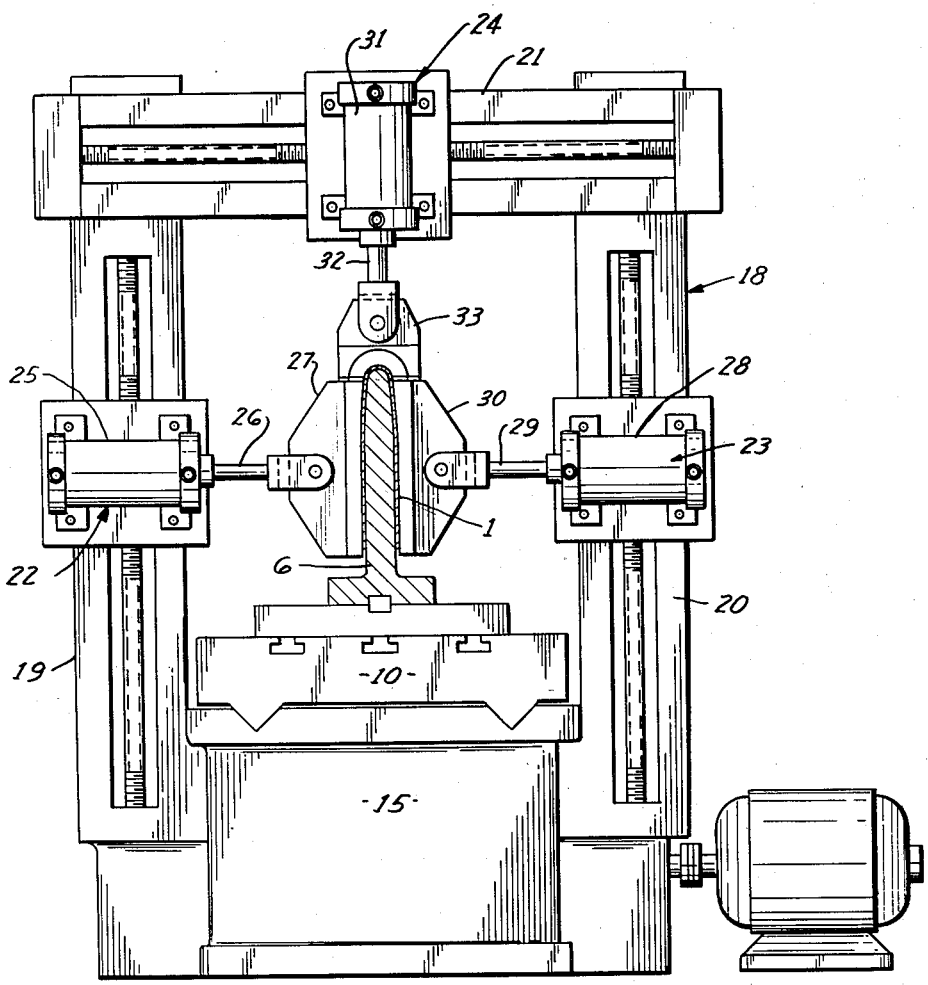
Fig. 4 is an enlarged left end elevation of the apparatus illustrated in Fig. 3, with the left end gripping mechanism removed and the mandrel and stock shown in section for clearness in illustration.

Figs. 6, 7, and 8 are cross sectional views taken on lines 6—6, 7—7, and 8—8, respectively, of Fig. 5; and Fig. 9 is a cross sectional view showing a modified form of a helicopter blade formed in accordance with the present invention.

Referring first to Fig. 1, the blade comprises an outer skin 1 formed of a single sheet of metal and providing the outer surface of the blade. This skin is reinforced at its leading edge by reinforces 2 and 3, each of which likewise may be formed of sheet metal. The reinforce 2 fits on its outer surface snugly against the inner face of the skin 1 and extends longitudinally of the blade the full length thereof. It terminates in a direction rearwardly of the blade a substantial distance from the leading edge but considerably short of the trailing edge. Disposed within the reinforce 2 is a reinforce 3 which is similar to the reinforce 2 and on its outer surface fits the inner surface of the reinforce 2. The reinforce 3 terminates, in a direction rearwardly from the leading edge of the blade, nearer to the leading edge than to the trailing edge of the reinforce 2.

A suitable light weight cellular reinforce or core 4 is disposed in the cavity within the skin 1. At its trailing edge the blade is closed by a suitable rigid closure member 5, the outer surface of which is formed so as to engage in face-to-face relation at its opposite faces the inner surfaces of the trailing margins of the skin, respectively. The reinforces 2 and 3, the cellular reinforce or core 4, and the closure member 5 all are secured to the skin by a suitable metal-bonding cement.

The reinforces and core may be a thermoplastic or thermosetting material, or, if desired, thin corrugated elongated strips of aluminum with corrugations extending transversely and bonded together side by side flatwise with their corrugations upright and those of each sheet staggered endwise of the sheets relative to those of adjacent sheets.

In forming the blade, the sheet of metal forming the skin 1 is placed in ordinary bending dies, as illustrated in Fig. 2, and is bent into a deep U-shaped cross section. It is next inverted from the position shown in Fig. 2 and placed on a mandrel 6 of a stretch forming machine. While resting on the mandrel, as illustrated in Fig. 3, the end margins of the stock are gripped in suitable gripping heads 7 and 8, each of which is mounted on its support so as to rotate about an axis extending generally lengthwise of and parallel to the mandrel. The support 9 of the head 7 is preferably stationarily mounted on a base 10 of the machine. The support 11 for the head 8 is carried on a slide 12 mounted on the base 10 for sliding movement endwise of the mandrel. The support 11 is connected to the piston 13 of a hydraulic piston and cylinder assemblage 14 which is arranged to receive pressure fluid in front of the piston so as to urge the support 11 in a direction endwise, away from the mandrel, or to the right in Fig. 3.

The base 10 is mounted on a frame 15 in suitable slideway so as to be reciprocable endwise of the frame 15 by means of a suitable motor driven worm 16 and follower 17.

Mounted on the frame 15 is a suitable upright frame 18 comprising upright frame members 19 and 20, arranged on opposite sides of the frame 15, and a header or top frame member 21. The upright members 19 and 20 and the top member 21 are provided with suitable trackways upon which are mounted the cylinders of reversible hydraulic or fluid operated piston and cylinder assemblages 22, 23 and 24, respectively. The assemblages 22 and 23 are adjustable vertically on the members 19 and 20 and the assemblage 24 is adjustable transversely of the frame 15 along the member 21.

The assemblage 22 includes a cylinder 25 and piston 26 to which is secured a wipe forming shoe 27 arranged to engage the sheet or skin 1 for substantially the full height of the mandrel. Correspondingly, the assemblage 23 has a cylinder 28 and a piston with a rod 29 on which is carried a wipe shoe 30 corresponding to the shoe 27 and engaging the opposite face of the stock on the mandrel.

The assemblage 24 comprises a cylinder 31 and a piston having a rod 32 on which is carried a wipe forming shoe 33 which engages the upper portion of the sheet 1.

In order to form the sheet its ends are gripped in the heads 7 and 8 and fluid pressure is admitted to the cylinder 14 so as to urge the piston rod 13, and thereby the gripping head 8, to the right in Fig. 3, thus placing the stock or sheet 1 under tension near to its elastic limit. The gripping heads 7 and 8 are rotated about horizontal axes so as to compensate or align themselves with the twist in the mandrel. The base 10 is then moved to the extreme right in Fig. 3 so that the shoes 27, 30, and 33 can be engaged with the stock on the mandrel adjacent the gripping head 7. The assemblage 14 maintains the tension. The shoes 27, 30 and 33 are maintained in wiping engagement by the introduction of pressure fluid into the cylinders 25, 28 and 32 behind their respective pistons.

While the wiping pressure and tension are maintained, the base 10 is driven to the left in Fig. 3, thus concurrently wipe forming and stretch forming the skin 1 about the mandrel.

Due to the concurrent wipe forming and stretch forming of the metal the grain thereof is improved and is generally lengthwise of the blade.

The skin is then removed from the machine and is found to be substantially in the form which it is to have in the final blade. Next, the reinforces 2 and 3 are inserted. These too may be preformed by combined wipe and stretch forming in the same manner as the skin itself, suitable mandrels being provided for such purposes. The reinforces 2 and 3 are then installed in the leading edge of the blade and the blade skin and reinforces cemented with metal cement so as to bond them into a unitary structure.

Next the cellular reinforce or core 4 is inserted and cemented after which the member 5 is installed and the margins of the skin drawn firmly thereagainst and cemented thereto.

In some instances the reinforce is somewhat differently formed. For example, as illustrated in Fig. 9, the reinforce 34 may be extruded substantially to shape, then stretch and wipe formed to impart its final shape and improve its metallurgical qualities. Instead of the member 5, a trailing edge member 35 is provided and arranged to be connected at its forward ends to the trailing margins 36 of the skin 37. The surfaces 38 of the trailing edge member 35 form a continuation of the surfaces of the skin 37.

The parts may be bonded together by metal-bonding cement and the blade may or may not be reinforced internally as desired.

Blades formed in accordance with the present invention will be found to have more accurate shapes, better grain structures, and better metallurgical properties than those formed by die forming, machining, and hand shaping.

Having thus described my invention, I claim:

1. The method of forming a helicopter blade comprising bending an elongated sheet of metal flatwise about an axis into generally U-shaped cross section, laying the partially formed sheet over a mandrel which is twisted about a longitudinal axis and shaped to impart final shape to the leading portion of the blade, which portion is at the base of the U-shaped section and extends partway toward the free ends of the arms of the U, concurrently twisting the sheet about said longitudinal axis, stretching it lengthwise, and wipe forming, so as to make it conform with the mandrel, installing in the formed sheet a relatively rigid reinforce which fits within, and reinforces, the leading portion for substantially the full length of the sheet, moving the trailing free margins of the sheet toward each other and into engagement with a relatively trailing edge member and securing them thereto.

2. The method according to claim 1 characterized in that, before moving the trailing margins of the sheet together, cellular reinforcing material is installed within the blade so as to extend from one inner face of the sheet metal to the other.

3. The method according to claim 1 characterized in that said reinforce is concurrently stretch formed and wipe formed into shape prior to installation.

4. The method according to claim 3 characterized in that said reinforce is a plurality of layers of sheet metal, each individually stretch and wipe formed, juxtaposed and bonded in face-to-face relation to each other.

References Cited in the file of this patent

UNITED STATES PATENTS

| | | |
|---|---|---|
| 1,996,850 | Bendix | Apr. 9, 1935 |
| 2,487,860 | Enos | Nov. 15, 1949 |
| 2,490,976 | Mayne et al. | Dec. 13, 1949 |
| 2,574,651 | Meyers | Nov. 13, 1951 |
| 2,574,980 | Meyers | Nov. 13, 1951 |
| 2,577,336 | Lampton | Dec. 4, 1951 |
| 2,658,265 | Brauehler et al. | Nov. 10, 1953 |
| 2,674,327 | Pullin et al. | Apr. 6, 1954 |
| 2,694,458 | Stevens | Nov. 16, 1954 |
| 2,713,376 | Bath | July 19, 1955 |

FOREIGN PATENTS

| | | |
|---|---|---|
| 651,117 | Great Britain | Mar. 14, 1951 |